May 20, 1958 N. M. BROWN, JR., ET AL 2,835,450
HIGH TEMPERATURE REGULATOR
Filed May 24, 1952 3 Sheets-Sheet 1
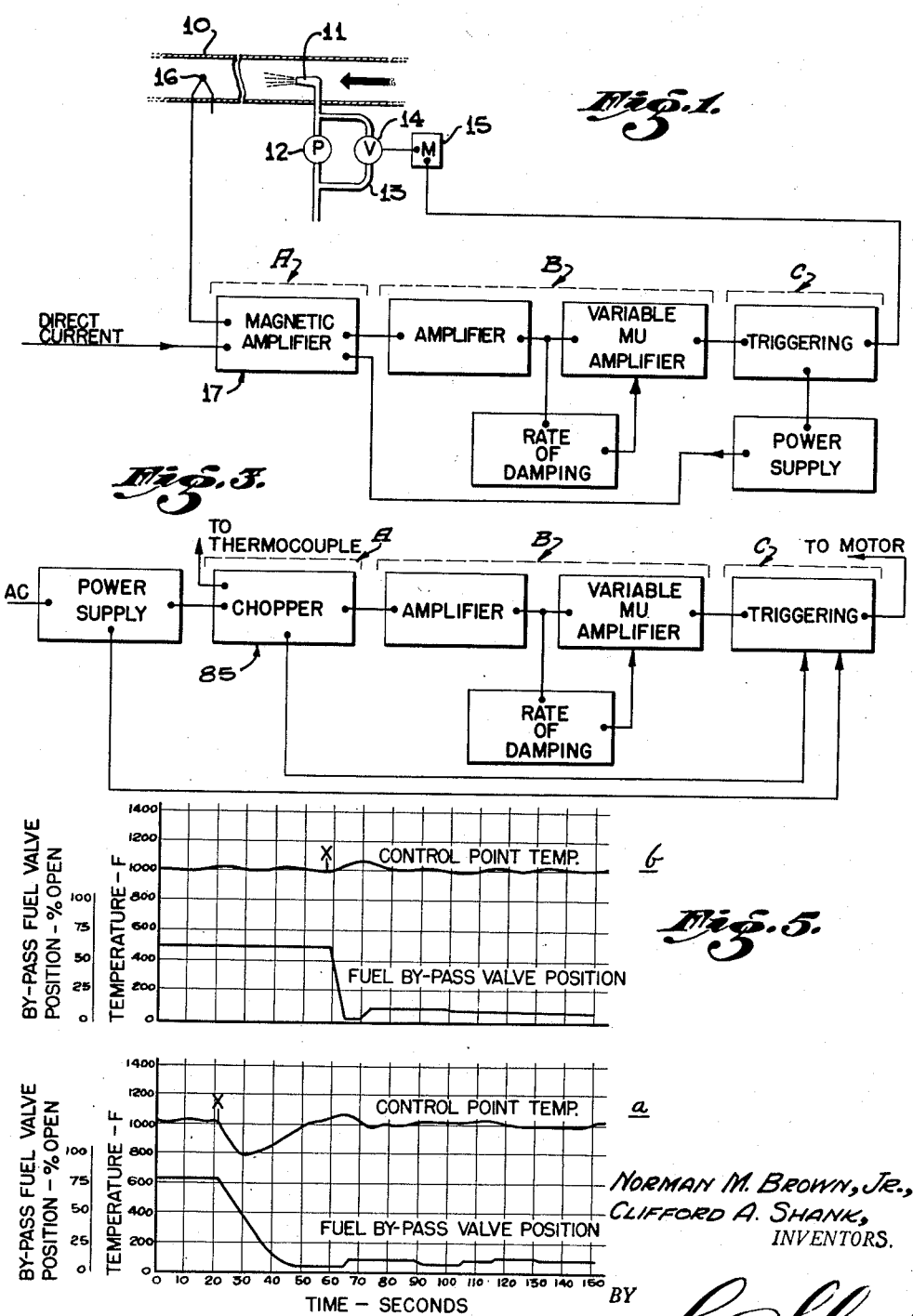
Norman M. Brown, Jr.,
Clifford A. Shank,
INVENTORS.
BY
ATTORNEY

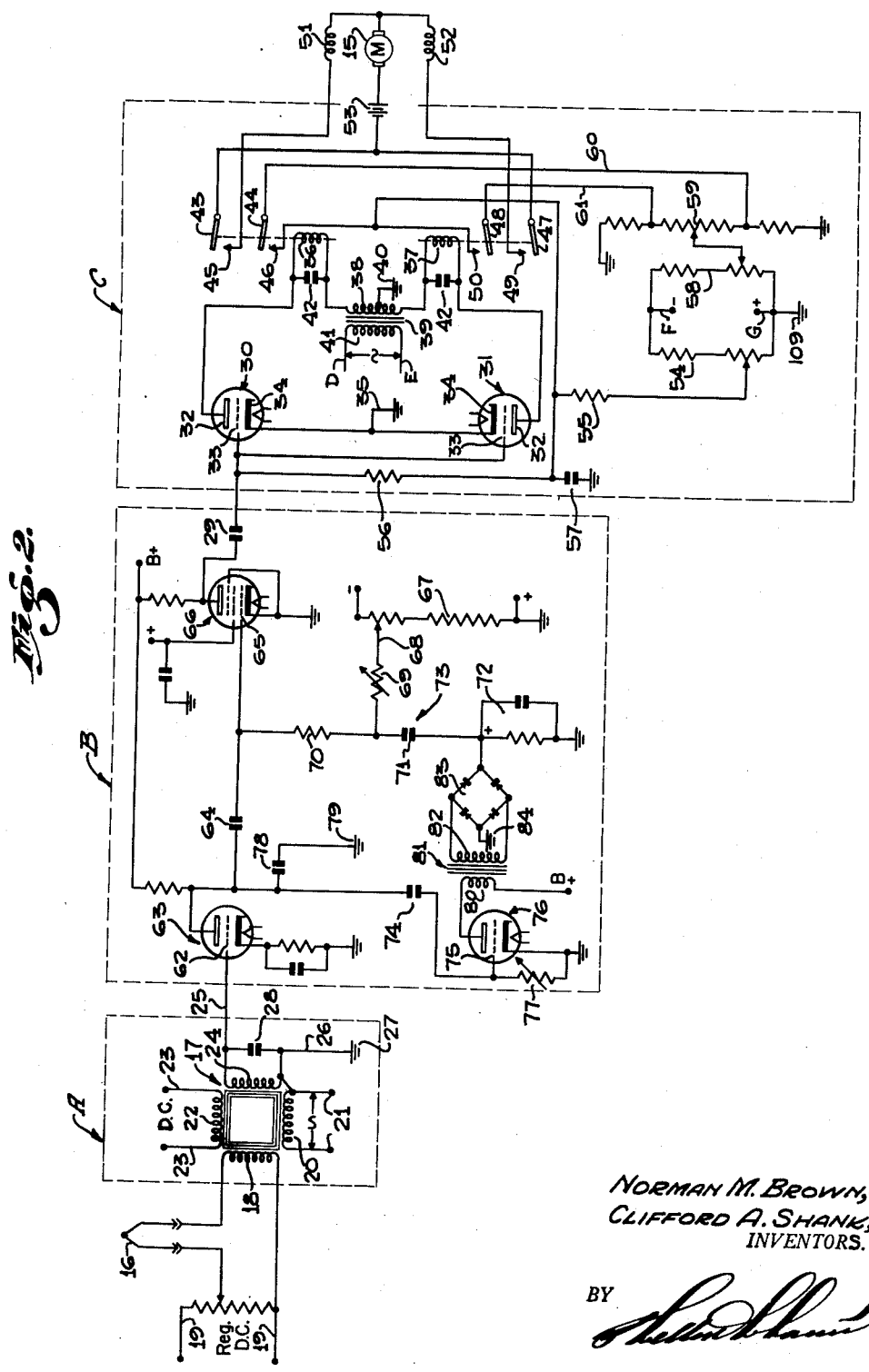

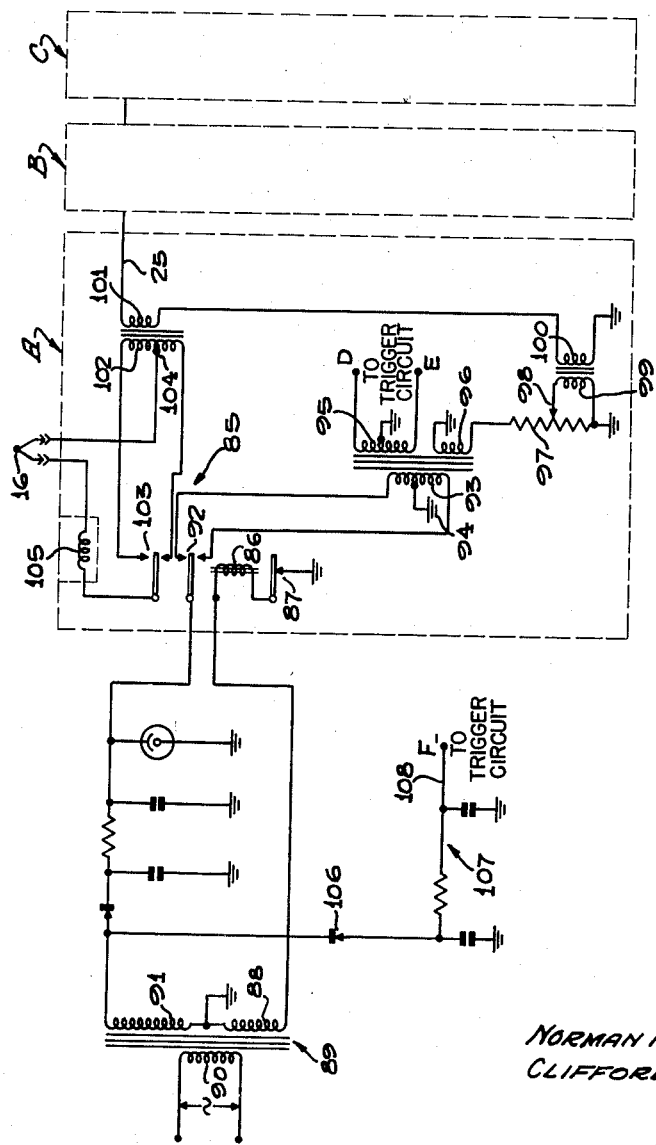

United States Patent Office 2,835,450
Patented May 20, 1958

2,835,450

HIGH TEMPERATURE REGULATOR

Norman M. Brown, Jr., Los Angeles, Calif., and Clifford A. Shank, Phoenix, Ariz., assignors to The Garrett Corporation, Los Angeles, Calif., a corporation of California Application May 24, 1952, Serial No. 289,916

11 Claims. (Cl. 236—78)

The present invention relates generally to regulating means, and is concerned particularly with apparatus for regulating the temperature within a chamber, compartment, duct or other area containing a fluid or mixture of fluids.

It is one object of the present invention to provide temperature regulating means, which may be utilized to maintain selected temperatures within a relatively high temperature range, for example, in the range of 500° F. to 2000° F.

While such apparatus is susceptible of general application for high temperature control, it finds particular use in connection with aircraft jet engines, where it becomes of utmost importance to regulate the tailpipe or exhaust temperatures; these temperatures being of such relatively high value as to prohibit the use of ordinary types of sensing pick-ups such as thermistors, and the like.

A further object is to provide temperature regulating apparatus for relatively high temperatures, which is essentially the equivalent of the conventional floating control in a servo-system having a very rapid response action. The conventional floating controller is unsuited for many high temperature applications as the temperature control valves or other means may not effect the desired temperature change until many seconds later. This time lag results in an undesirable overshooting or oscillation of the temperature about the desired values.

A still further object is to provide a high temperature regulator embodying an electronic anticipator by means of which an appropriate additive or subtractive action is applied to the temperature control means as the temperature deviates from or approaches balance, and wherein this action is automatically applied in frequency and amount determined by the temperature rate of change as sensed by appropriate pick-up means.

Another object is to provide in a high temperature regulator, an anticipator circuit which introduces a control component proportional to the rate of change of an error or unbalance signal, and which does not require the use of separate pick-ups or sensing means for its operation.

Still another object is to provide apparatus of the described character, which is simple of operation, lightweight and small size, and which is accurate and dependable in operation under all operating conditions.

Briefly, the present invention in accordance with its broad concept comprises a temperature sensing and signal emitter device by means of which an alternating current output signal is emitted in accordance with sensed temperature changes of a fluid medium, the emitted signal having a phase characteristic which is determined by the direction of deviation of the fluid temperature from a predetermined norm, and an amplitude characteristic which is a measure of the temperature departure.

From the temperature sensing and signal emitter device, the signal is carried to an anticipator and amplifier containing electronic elements arranged to introduce a control component which is proportional to the rate of change of the unbalance or error signal, and hence a measure of the rate of temperature change of the fluid medium.

The unbalance or error signal emitted from the temperature sensing and signal emitter device, as modified by the anticipator and amplifier for rate of change of the fluid medium temperature, is conducted to a triggering circuit which is arranged to appropriately control a suitable actuator arranged to operate devices for restoring the fluid medium temperature to normal condition, this temperature corrective action being accomplished by pulses of power having a frequency and length proportional to the combination of temperature unbalance and rate of change of temperature.

The time lag between the operation of the temperature correcting devices, and the time when such corrections are sensed by the temperature sensing and signal emitter device, is compensated for in a differentiating R-C network of the anticipator and amplifier.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a block diagram illustrating one embodiment of the present invention;

Fig. 2 is a view diagrammatically illustrating electronic devices and circuit arrangement of the embodiment of the invention shown in Fig. 1;

Fig. 3 is a block diagram showing a modified embodiment of the invention;

Fig. 4 is a view diagrammatically illustrating the electronic devices and circuit arrangement of the modified embodiment of the invention; and Fig. 5 shows graphically curves of performance of the regulator of the present invention.

Referring particularly to Fig. 1 of the drawings, for purposes of description the invention is illustrated as being applied to a fluid flow duct, as generally indicated by the numeral 10, for conducting a heated fluid or mixture of fluids. This duct might in practice comprise a compartment, chamber or other area. For present discussion of the invention, however, it is considered as being the tail-pipe of an aircraft jet engine wherein various expedients might be utilized to regulate the temperature of the fluid. For example, the temperature of fluid flowing through the tail-pipe might be regulated by changing the size of the exhaust orifice, or as in some installations by regulating the fuel supply to the jet engine. The latter arrangement is diagrammatically illustrated as comprising a nozzle 11 which is supplied with a combustible fuel from a suitable source of supply by means of a fuel pump 12 having its outlet and inlet connected with a bypass 13 which is controlled by a valve 14 motivated by a suitable actuator such as an electric motor 15 to control the amount of fuel supplied to the nozzle 11, and as a consequence the temperature of the fluid flowing through the duct 10.

Downstream from the nozzle 11, there is positioned a sensing element, in this case a thermocouple 16 which is electrically connected with a temperature sensing and signal emitting device, as generally indicated at A. The emitted signal is carried to an anticipator and amplifier B, where a control component proportional to the rate of change of temperature of the fluid is introduced. The amplified and modified signal is then carried to a triggering circuit C which controls the actuation of the valve 14 by the motor 15 to correct and restore the temperature of the fluid to a normal pre-selected condition.

Details of the circuits and electronic devices for the sensing, amplification, anticipation and control of the actuator motor are clearly shown, for this embodiment of the invention, in Fig. 2. In this instance, the signal emitter comprises a magnetic amplifier 17 having a winding 18 which is connected with a regulated direct current reference voltage source 19 by a circuit containing the thermocouple 16. Another winding 20 connects with suitable alternating current power source 21, while a biasing winding 22 is connected with a suitable direct current power source 23. A winding 24 connects with an output circuit consisting of a conductor 25 and a conductor 26, which is grounded at 27, a noise reducing condenser 28 being placed across the winding 24.

The temperature sensing and signal emitter arrangement just described provides in its output circuit an alternating current signal, the phase of which is determined by the direction of deviation of the temperature of the fluid as sensed by the thermocouple 16 from a predetermined temperature norm, and the amplitude of which is a measure of the temperature departure from the predetermined temperature norm.

The output signal is then carried through the anticipator and amplifier B, the details of which will subsequently be described, whence it is delivered through a coupling condenser 29 to the triggering circuit C which will now be described in detail.

The triggering circuit is shown in this instance as including two triode tubes 30 and 31, although it will be readily appreciated that a dual-triode may be employed as is well known in the art. Each of the tubes 30 and 31 has a conventional plate 32, a control grid 33 and cathode 34. The cathodes of these tubes are interconnected and grounded at 35. The control grids 33 are interconnected and have a common connection with the output circuit of the anticipator and amplifier B through the coupling condenser 29. The plates 32 of the tubes are interconnected through a series circuit containing relay windings 36 and 37, and a secondary transformer winding 38 of transformer 39, the winding 38 having a mid-tap grounded as indicated at 40. The transformer 39 has a primary winding 41 which is connected to a suitable source of alternating current as indicated by the conductors D and E respectively. This source may be the same source which supplies the winding 20 of the magnetic amplifier 17, in which case the potentials would be in phase, although the winding 20 and winding 41 might be supplied from sources in which the potentials may be 180° out of phase.

The relay windings 36 and 37 are respectively bridged by a condenser 42 connected across the winding terminals. The relay winding 36 is operatively associated with normally open switches 43 and 44, which are arranged to engage contacts 45 and 46 upon energization of the associated relay winding. In a similar manner, the relay winding 37 is arranged to actuate upon energization switches 47 and 48 into engagement with contacts 49 and 50 respectively.

The motor 15 has one of its terminals connected through a field coil winding 51 to the contact 45, and another field coil winding 52 with the contact 49, so that upon selective energization of the relay windings 36 and 37, the direction of the rotation of the motor 15 will be controlled by the actuation of switch 43 or 47, which connects the motor with a power source, shown as a battery 53 having a connection with the other terminal of the motor.

Considering now the operation of the triggering circuit C, as thus far described, it will be apparent, in connection with the tubes 30 and 31, that one of the plates 32 will have a supplied alternating potential which is 180° out of phase with that which is supplied to the other plate, whereas the potential of the alternating signal supplied to both the grids 33 may be in phase with that on either one or the other of the plates 32, or will be zero. The phase relationship will depend upon the direction in which the temperature departure from norm occurs, as indicated by the error or unbalance signal received from the signal emitter device A.

Thus, if the unbalance is in a direction such that the output signal voltage applied to the grids 33 is in phase with that appearing at the plate of tube 30 and out of phase with the voltage appearing on the plate of tube 31, an energizing current will flow in relay winding 36. Switch 43 will then be actuated into engagement with contact 45 so as to energize the field winding 51 of the motor 15 which now operates in a direction to operate the temperature restoring devices, in this case move valve 14 in proper direction to bring the temperature back to norm or balance.

When the bridge is unbalanced in an opposite direction from that stated above, the phase relationship of the signal voltage will be reversed so that it is now in phase with that appearing at the plate of tube 31 and out of phase with that appearing at the plate of tube 30. In such event, an energizing current will flow in relay winding 37 and actuate switch 47 into engagement with its associated contact 49, whereupon the field coil winding 52 is energized to operate the motor in a reverse direction to return the temperature to normal condition.

With the return of the amplitude of the error signal to a normal or substantially normal condition, upon correction of the fluid temperature, and with a fixed negative bias on the grids of the tubes 30 and 31 as will hereinafter be discussed, the current which normally flows in the plate circuits of the tubes through the relay windings will be insufficient to actuate the switches 43 and 47, or maintain them in a previously closed position. Further operation of the motor will then be terminated.

In summarizing, it will be seen that, when the temperature unbalance is in one direction, the triggering circuit energizes the reversible motor in one direction, and when the direction of unbalance is reversed, the direction of energization of the motor is likewise reversed.

A negative potential source for biasing the grids of tubes 30 and 31 is shown as being supplied from conductors F and G which may comprise the opposite sides of a suitable direct current potential source. This potential source is connected across a voltage divider 54 having an adjustable tap connection with the grids of tubes 30 and 31 through a resistor 55 and an isolating resistor 56. The connection between the adjacent terminals of resistors 55 and 56 is grounded through a condenser 57 of an R-C network including the resistor 55.

With the foregoing arrangement, a fixed negative bias is applied to the grids of the tubes 30 and 31, this bias being of predetermined value and so chosen as to determine the dead band or inactive range within which there is an insufficient current flow in the plate circuits of tubes 30 and 31 to pick up and operate the relay switches for controlling the direction of rotation of the motor 15.

In order to prevent over-shifting and subsequent hunting of the motor 15, the triggering circuit is arranged so that the motor will be pulsed in a step-by-step manner in its movement of the temperature control devices in restoring the fluid temperature to normal condition of balance. For such purpose, means are provided for applying a modulating negative bias to the grids of the tubes 30 and 31, when either of the relay windings 36 and 37 is energized.

More specifically, a voltage divider 58 is also connected across the source of bias potential, this voltage divider having an adjustable connection with a potentiometer 59 which has connection through conductors 60 and 61 with switches 44 and 48 respectively. Upon closure of either one of the switches 44 or 48, the associated conductor 60 or 61 is connected with the ungrounded side of the condenser 57 and applies a transient bias to the grids of the tubes 30 and 31. Adjustments of the voltage divider 58 and the potentiometer 59 influence the modulating band width, but the voltage divider 58 is for width and the potentiometer is for pulse equalization.

Under normal conditions, it will be apparent that the condenser 57 will receive a voltage charge through resistor 55, but upon closing of either switch 44 or 48, an increased voltage will be placed across the condenser depending upon the adjustment of the connection between the voltage divider 58 and the potentiometer 59. The amount of resistance which is in series with the condenser will constitute an R-C charging circuit having a time constant depending upon the values utilized for the condenser and resistance elements. Thus, after a time interval, determined by the time constant of the R-C circuit, the modulating negative bias will be applied to the grids of the tubes to obtain pulsing operation of the motor 15. Briefly, the modulating or transient bias will oppose the applied signal potential resulting from the unbalance or error signal. This negative bias will gradually build up until ultimately the plate current will be reduced to a drop out value for the relay winding 36 or 37, as the case may be, unless the unbalance is so great that a signal potential of greater magnitude than that of the negative bias is produced. It is characteristic of this combination signal and biasing arrangement that the frequency and length of pulses are varied in proportion of the magnitude of the signal produced by the temperature unbalance or departure from norm. Hence, the error signal may reach a sufficiently high value to cause a "full-on" condition in which the motor 15 will initially run continuously and thereafter with pulsing action until temperature norm is restored.

Drop out of either relay will deenergize the motor 15 and concurrently open the circuit through switch 44 or 48, as the case may be. The condenser 57 is thereupon connected into an R-C discharging time circuit in which the condenser discharges through resistor 55 to ground. The negative bias applied to the grids thus bleeds off slowly through the network until the plate current again increases to a value sufficient to actuate the relay, thereby reestablishing the conditions prevailing previously. This sequence of operating pulses of the motor 15 continues until the movement of the connected devices reestablishes the temperature condition to normal.

As thus far described, it will be appreciated that in installations where there might be an appreciable physical distance between the sensing thermocouple and the fuel nozzle or other means for effecting changes in the temperature of the fluid medium, there may be an appreciable time lag between the beginning of the corrective operation and the time when such correction is sensed and a signal emitted to terminate the operation of the motivating device, such as the motor 15. Under such conditions, conventional floating control would permit greater corrective operation than necessary, causing the temperature to over-shoot or oscillate about the desired or norm value. In order to overcome this disadvantage, the present invention contemplates an electronic anticipator and amplifier B which is arranged to provide an appropriate additive or subtractive action to the temperature corrective devices as the temperature deviates from or approaches balance. This action is automatically applied in an amount determined by the temperature rate of change as sensed by the thermocouple pick-up.

Considering, in greater detail, the anticipator and amplifier B, the conductor 25 of the output circuit of the magnetic amplifier 17 is connected to a control grid 62 of a first stage amplifying tube 63. The output or plate circuit of the tube 63 is connected through a suitable coupling condenser 64 with a control grid 65 of a variable mu tube 66 which constitutes the final stage of amplification and has its output circuit connected with the coupling condenser 29 to feed the triggering circuit C as previously explained. A variable mu tube is utilized in the amplifier because of its characteristic whereby its gain changes with bias. Advantage is taken of this characteristic for a purpose which will be subsequently explained in greater detail.

The control grid 65 of the tube 66 is provided with an appropriate normal bias, a voltage divider 67 being connected across a suitable direct current potential source and through a suitable tapped connection 68 applies a negative potential to the grid through a resistor 69 and grid leak 70. The interconnected adjacent ends of the resistor 69 and grid leak 70 are connected to one side of coupling condenser 71 having a ground connection through a filter network 72.

The resistors 67 and 69 and condenser 71 form an R-C timing circuit of a differentiating network 73 which will now be further explained.

The output circuit of tube 63 is likewise coupled through a condenser 74 with a control grid 75 of a high gain tube 76, the gain of which is adjustable by means of variable resistor 77. A decoupling condenser 78 has one side connected between the coupling condensers 64 and 74, and its other side grounded as indicated at 79.

The plate circuit of tube 76 is connected to a primary winding 80 of a transformer 81 which has its secondary 82 connected across the input terminals of a bridge rectifier 83. The bridge rectifier has its positive terminal connected to the grounded side of coupling condenser 71, whereas its other terminal is grounded at 84.

As previously mentioned, the purpose of the anticipator circuit just described is to introduce a control component which is proportional to the rate of change of the error or unbalance signal, and hence the rate of temperature change of the fluid medium. It will be apparent that the amplitude of the emitted signal will be reflected in the rectified direct current potential which is applied, in series with the potential appearing across the voltage divider 67, across the terminals of condenser 71. It will, therefore, be apparent that the rectified voltage will modulate the bias which is imposed upon the variable mu tube grid 65. With this arrangement, when the rate of change of temperature is relatively small, the rectified potential will likewise be small and will tend to leak-off to ground through the resistor 69 and the voltage divider 67 faster than the tendency to increase the voltage across the condenser 71, thus having little or no effect upon the normal bias of the tube 66.

However, in the event that a rapid change of temperature takes place, the rectified potential will suddenly build up the potential across the condenser 71 so that the condenser will now charge, and simultaneously the condenser 71 will discharge through resistor 69 and the voltage divider 67 to ground. Initially, the bias on the control grid 65 will be made more negative so as to cut down or decrease the tube gain and thus reduce the amount of error signal transmitted to the triggering circuit, and the amount of correction applied by the motor 15. After a time interval depending upon the resistance and capacitance values, the bias will be returned to normal. This time interval is adjusted by changing the resistor 69 so as to correspond substantially with the time lag between the time of sensing the temperature change and the actuation of the motor 15, and the time when the corrected temperature is sensed by the pick-up device. Overshooting and oscillation are thus eliminated and a temperature regulator is obtained which has the fundamental advantages of a floating control.

Referring to Fig. 3, the modified embodiment of the invention differs primarily from that disclosed in Figs. 1 and 2 by utilizing a chopper, as generally indicated by the numeral 85, and in the manner of supplying power to the chopper and the triggering circuit.

More specifically, referring to Fig. 4, it will be seen that the chopper comprises an operating coil 86 which is connected in series with a make and break contact 87 across an appropriate secondary winding 88 of a transformer 89 having a primary 90 connected with a suitable source of alternating current. A second secondary winding 91 feeds a conventional rectified and filtering circuit by which a rectified and filtered potential is applied by a switch 92 alternately to the end terminals of a transformer primary winding 93 having its midpoint grounded at 94. This transformer has a multiple secondary winding, one of these windings, as indicated by the numeral 95 forming a source of power supply which may be connected to the conductors D and E of the triggering circuit as shown in Fig. 2. The transformer has another secondary winding 96 which has its terminals connected across a potentiometer 97 having an adjustable contact connection 98 by means of which a desired potential may be imposed upon a transformer primary winding 99 and thus place a fixed reference voltage at the terminals of a transformer secondary winding 100.

The secondary winding 100 is connected in series with a secondary winding 101 which is connected through conductor 25 with the control grid 62 of the tube 63 as shown in Fig. 2. The secondary winding 101 is inductively coupled in the transformer with a primary winding 102 arranged to have its end terminals alternately connected by switch 103 with one side of the thermocouple 16, the other side of the thermocouple being connected to an intermediate connection 104 of the winding 102. A compensating network is represented by the resistance 105 which is arranged to correct for any change in ambient temperature and maintain the cold junction of the thermocouple at a constant value.

From the foregoing description, it will be apparent that the fixed reference alternating voltage of the transformer secondary winding 100 will be modulated through the transformer secondary winding 101 by temperature variations as sensed by the thermocouple 16 to provide a signal error or unbalance voltage which is impressed upon the anticipator and amplifier B in a similar manner to the output of the magnetic amplifier discussed in connection with Fig. 2.

In this modified arrangement, the bias voltage source for the triggering circuit may be obtained from the transformer secondary winding 91. This is accomplished by connecting one side of a rectifier 106 with the ungrounded side of winding 91, and the other side of the rectifier 106 through a filter network 107 to ground. Connection 108 is in this case connected to conductor F of the triggering circuit C, as shown in Fig. 2, and conductor G thereof is grounded as indicated at 109.

It will thus be seen that the arrangements disclosed in Figures 2 and 4, respectively, operate to produce substantially the same features of control, the main difference being in the manner in which the two arrangements are adapted for different installment requirements.

Considering now, in greater detail, the operation will be briefly as follows:

The temperature of the fluid medium is converted into electrical information by means of the thermocouple 16 located in the area where it is desired to control the temperature. When the temperature is at proper value, this thermocouple generates a voltage which is balanced by a voltage in the temperature sensing and signal emitter device A and the system is in electrical balance. At any other temperature the voltage output of the thermocouple changes, causing an electrical unbalance which operates in the one arrangement through the magnetic amplifier, and in the other arrangement through the chopper to send out a signal to the anticipator and amplifier, and thence to the triggering circuit.

When the triggering circuit receives the signal from the amplifier signifying an unbalance condition, it recognizes the direction of this unbalance and closes the corresponding relay to actuate the motor 15 in a proper direction to bring the system back into balance. The power applied to the motor 15 is modulated into pulses of power of frequency and length proportional to the unbalance existing. If the amount of unbalance is small, the frequency of the pulses of power is small as well as the power pulse width; whereas if the unbalance is large, the amount of power pulsed will be large due to a higher frequency of pulsing and greater pulse width.

The anticipator circuit modulates the signal impressed upon the grid 65 of the variable mu tube 66 to introduce a control component proportional only to the rate of change of the unbalance signal. Separate anticipator pick-ups are not used, but the main signal from the signal emitter is also coupled with a branch circuit to the rectifier 83 to provide a source of rectified potential, which is applied to a differentiating network connected to the input of the variable mu tube, and thus modify the unbalance signal being fed to the triggering circuit.

The arrangements thus provide in a system having a time lag, a control which is essentially the equivalent of conventional floating control. Overshooting and oscillation are thus effectively counteracted.

Referring to Fig. 5, the effectiveness of a control system embodying the features of the present invention is graphically illustrated by the curves a and b, respectively.

With a duct arrangement as shown in Fig. 1, for conducting the fluid, and a nozzle for fuel by which the fluid is heated, this nozzle being controlled by the operation of a bypass valve around the fuel supply pump, the temperature selector was set to a temperature control point of 1000° F. The temperature of the fluid flowing through the duct was then decreased, as by opening a valve for controlling the supply of fluid to the duct 10, so as to decrease the temperature at a rate of 40° F. per second. Such a temperature change in the system was effected at point X, as indicated in both of the curves.

Curve a is with the anticipator circuit disconnected. From the point X, it is significant that the control point temperature is materially decreased and then begins to rise, continuing past the selected temperature setting to a point above 1000° F., and then is returned substantially to normal selected temperature. A considerable length of time to accomplish this correction is indicated with an oscillation and overshooting of the temperature before normal conditions are restored.

Referring now to curve b, the same operating conditions are shown with the anticipator circuit connected. It will be noted that the length of time to accomplish restoration to normal conditions is materially decreased, and that the oscillation and overshooting is substantially eliminated.

Various modifications may suggest themselves to those skilled in the art without departing from the spirit of the herein described invention, and, hence, we do not wish to be restricted to the specific form or forms shown or uses mentioned, except to the extent indicated in the appended claims.

We claim:

1. Apparatus for regulating the temperature of a fluid medium, comprising: signal emitting means having a signal output circuit variable in response to temperature changes in said fluid medium; means for amplifying the said signal including a variable mu tube having a control grid, and an output circuit; means controlled by the signal from said latter output circuit for correcting the temperature of said fluid medium by step-by-step pulses variable in proportion to the magnitude of the output signal; means normally biasing said grid; a potential source coupled with said signal output circuit and varied in accordance with the rate of change of temperature of said fluid medium; means combining said potential source with said normal biasing means to initially modify said pulses for rate of change of temperature; and resistor-capacitor bleeder means acting to restore said bias to normal after a time interval.

2. Apparatus for regulating the temperature of a fluid medium, comprising: signal emitting means having a signal output circuit variable in response to temperature changes in said fluid medium; means for amplifying the said signal including a variable mu tube having a control grid, and an output circuit; pulsing means controlled by the signal from said latter output circuit operating to correct the temperature of said fluid medium in step-by-step manner; means normally biasing said grid; means coupled with said signal output circuit and controlled by said signal for varying said bias in accordance with the rate of change of temperature of said fluid medium; and resistor-capacitor bleeder means acting to restore said bias to normal.

3. Apparatus for regulating the temperature of a fluid medium, comprising: signal emitting means having a signal output circuit variable in response to temperature changes in said fluid medium; means for amplifying the said signal including a variable mu tube having an input circuit for receiving said signal; means coupled with said signal output and controlled by said signal for modifying the input signal to said tube in accordance with the rate of change of said fluid temperature from a predetermined value; temperature corrective means energizable to restore the temperature to the predetermined value; and means controlled by said modified and amplified signal for energizing the temperature corrective means in successive step-by-step energizing pulses.

4. Apparatus for regulating the temperature of a fluid medium, comprising: signal emitting means having a signal output circuit variable in response to temperature changes in said fluid medium; means for amplifying the said signal including a variable mu tube having an input circuit for receiving said signal, and output circuit; means controlled by the signal from said latter output circuit for correcting the temperature of said fluid medium in variable pulses; and a variable biasing circuit for said tube including an R-C network coupled with said signal emitting means ahead of said variable mu tube for varying said bias in accordance with the rate of change of temperature of said fluid medium.

5. Apparatus for regulating the temperature of a fluid medium, comprising: signal emitting means including a magnetic amplifier having a reference voltage connection; means for varying said reference voltage to change the characteristic of the emitted signal in accordance with temperature changes of said fluid medium; and means controlled by said emitted signal for increasing and decreasing the temperature of said fluid in successive pulses modulated in accordance with the rate of change of temperature of said fluid medium.

6. Apparatus for regulating the temperature of a fluid medium, comprising: means for emitting an error signal in accordance with variations of the fluid temperature from a predetermined norm; means controlled by said signal for restoring said temperature to said norm by a plurality of corrective pulses; and means for modifying said pulses in accordance with the rate of change of said error signal from norm so that the pulses will be of low frequency and small length, when the error signal is small, and higher frequency and greater length, when the error signal is large.

7. Apparatus for regulating the temperature of a fluid medium, comprising: signal emitting means variable in response to temperature changes in said fluid medium; means controlled by said signal for emitting a plurality of temperature correcting pulses; and means modifying the frequency and length of said pulses in accordance with the rate of change of said fluid temperature.

8. Apparatus for regulating the temperature of a fluid medium, comprising: signal emitting means including a magnetic amplifier having a reference voltage connection; means for varying said reference voltage to change the characteristic of the emitted signal in accordance with temperature changes of said fluid medium; means controlled by said signal for correcting said temperature by corrective pulses, including an electronic amplifier having a variable bias control electrode circuit; and means for modifying the frequency and length of said pulses in accordance with the rate of change of said fluid temperature, including an R-C network controlled by said signal and having a connection with said electrode bias circuit.

9. Apparatus for regulating the temperature of a fluid medium, comprising: signal emitting means having a signal output circuit variable in response to temperature changes in said fluid medium; temperature correction means; means controlled by said signal for intermittently energizing said temperature correction means in variable power delivering electrical pulses, including an electronic amplifier having a control electrode; a bias circuit connected with said electrode, said circuit including resistor means and a condenser forming an R-C network; an adjustable first potential source connected to said network for charging said condenser to a normal biasing voltage for said electrode; and a second potential source coupled with said signal output circuit and controlled by said signal in accordance with the rate of change of said fluid medium, said second potential source being connected to said network and operating to apply a charge on said condenser for modifying said normal bias and the consequent pulses according to the rate of change of the fluid medium.

10. Apparatus for regulating the temperature of a fluid medium, comprising: signal emitting means having a signal output circuit variable in response to temperature changes in said fluid medium; temperature correction means; means controlled by said signal for intermittently energizing said temperature correction means in variable electrical power pulses, including a variable mu tube having a control electrode coupled with said signal output circuit; a bias circuit connected with said electrode, said circuit including resistor means and a condenser forming an R-C network; an adjustable first potential source connected to said network for charging said condenser to a normal biasing voltage for said electrode; rectifier means energized from said signal output circuit and having an output direct current potential controlled by said signal in accordance with the rate of change of said fluid medium; and means connecting said rectifier output direct current potential in series with said first potential source so as to apply a charge on said condenser for modifying the normal bias on said electrode and the consequent power pulses.

11. Apparatus for regulating the temperature of a fluid medium, comprising: an electrical source; first transformer means having a center tapped primary winding, and a secondary winding; second transformer means including a center tapped primary winding, and a secondary winding connected in circuit with the secondary winding of said first transformer means; a thermocouple responsive to temperature changes in said fluid medium; electromagnetic means having contacts operable to alternately connect the center tap and each end of the primary winding of said second transformer means with said electrical source to set up a fixed reference voltage in the associated secondary winding, and other contacts operable to alternately connect the center tap at each end of the primary winding of said first transformer means to set up a modulating voltage in the associated secondary winding to produce a variable signal in accordance with said temperature changes; and means controlled by said signal for correctively changing the fluid temperature in a step-by-step manner.

References Cited in the file of this patent

UNITED STATES PATENTS

| | | |
|---|---|---|
| 1,730,254 | Thomas | Oct. 1, 1929 |
| 2,124,684 | Behr | July 26, 1938 |
| 2,154,375 | Chambers | Apr. 11, 1939 |
| 2,282,726 | Jones | May 12, 1942 |
| 2,366,618 | Harrison | Jan. 2, 1945 |
| 2,426,711 | Shaffer | Sept. 2, 1947 |
| 2,544,031 | Kyle | Mar. 6, 1951 |

OTHER REFERENCES

Ogle: Pages 41–46 of the General Electric Review for October 1950.